US011486886B2

(12) United States Patent
Ogawa (10) Patent No.: US 11,486,886 B2
(45) Date of Patent: Nov. 1, 2022

(54) AUTOMATIC ANALYZER AND AUTOMATIC ANALYSIS METHOD

(71) Applicant: JEOL Ltd., Tokyo (JP)

(72) Inventor: Toru Ogawa, Tokyo (JP)

(73) Assignee: JEOL Ltd., Tokyo (JP)

(*) Notice: Subject to any disclaimer, the term of this patent is extended or adjusted under 35 U.S.C. 154(b) by 302 days.

(21) Appl. No.: 16/442,927

(22) Filed: Jun. 17, 2019

(65) Prior Publication Data
US 2019/0383843 A1  Dec. 19, 2019

(30) Foreign Application Priority Data

Jun. 19, 2018 (JP) .............................. JP2018-115734

(51) Int. Cl.
*G01N 35/00*  (2006.01)
*G01N 35/10*  (2006.01)

(52) U.S. Cl.
CPC ... *G01N 35/00732* (2013.01); *G01N 35/1009* (2013.01)

(58) Field of Classification Search
CPC ......... G01N 35/00732; G01N 35/1009; G01N 35/025; G01N 35/1072; G01N 2035/00524; G01N 2035/1025; G01N 35/00603; G01N 35/1016; G01N 35/10; G01N 2035/1032
See application file for complete search history.

(56) References Cited

U.S. PATENT DOCUMENTS

| 5,876,668 A | 3/1999 | Kawashima et al. |
| 5,919,706 A | 7/1999 | Tajima |
| 9,817,013 B2 | 11/2017 | Yanami et al. |

(Continued)

FOREIGN PATENT DOCUMENTS

| EP | 1460432 A1 | 9/2004 |
| EP | 2151690 A2 | 10/2010 |

(Continued)

OTHER PUBLICATIONS

Extended European Search Report issued in EP19180109.1 dated Sep. 18, 2019.

(Continued)

*Primary Examiner* — Jill A Warden
*Assistant Examiner* — John McGuirk
(74) *Attorney, Agent, or Firm* — The Webb Law Firm (57) ABSTRACT

An automatic analyzer includes: a diluted sample holding unit configured to hold dilution containers into which a diluted sample is dispensed; a reaction container holding unit configured to hold reaction containers; a dispensing device configured to dispense the diluted sample from the dilution containers to the reaction containers; a measuring unit configured to perform optical measurement of the diluted sample reacted with reagents corresponding to test items in the reaction containers; a storage unit configured to store information on the diluted sample associated with each of the dilution containers; and a dispensing control unit. The dispensing control unit extracts a dilution container for collecting the diluted sample for retest by searching for the information on the diluted sample stored in the storage unit, and causes the dispensing device to perform a retest dispensing process.

7 Claims, 5 Drawing Sheets

(56) References Cited

U.S. PATENT DOCUMENTS

| | | | |
|---|---|---|---|
| 2008/0206097 A1* | 8/2008 | Takahashi .......... | G01N 35/1011 422/64 |
| 2009/0068748 A1 | 3/2009 | Komatsu et al. | |
| 2009/0214385 A1 | 8/2009 | Mori et al. | |
| 2013/0111978 A1 | 5/2013 | Mizumoto et al. | |

FOREIGN PATENT DOCUMENTS

| | | | |
|---|---|---|---|
| JP | 8194004 A | | 7/1996 |
| JP | 200968840 A | | 4/2009 |
| JP | 2009204409 A | | 9/2009 |
| JP | 2011117755 A | | 6/2011 |
| JP | 201720956 A | | 1/2017 |
| JP | 2017020956 A | * | 1/2017 |
| JP | 201872125 A | | 5/2018 |
| WO | 9632649 A1 | | 10/1996 |

OTHER PUBLICATIONS

Office Action issued in JP2018-115734 dated Oct. 12, 2020.
Examination Report issued in EP19180109.1 dated Sep. 20, 2021.

* cited by examiner

AUTOMATIC ANALYZER AND AUTOMATIC ANALYSIS METHOD

CROSS-REFERENCE TO RELATED APPLICATION

This application claims priority to Japanese Patent Application No. 2018-115734 filed Jun. 19, 2018, the disclosure of which is hereby incorporated by reference in its entirety.

BACKGROUND OF THE INVENTION

Field of the Invention

The present invention relates to an automatic analyzer and an automatic analysis method.

Description of Related Art

In a biochemical analyzer that analyzes biological components contained in a sample such as blood or urine among automatic analyzers, in order to reduce an amount of sample or reagent used as a specimen for measurement, an operation is performed in which saline and pure water are dispensed together with the sample into a dilution container to dilute the sample.

In such an automatic analyzer, when the amount of specimen required for analysis exceeds a volume of the dilution container, a dilution pipette dispenses the same sample into a plurality of dilution containers. In addition, there is disclosed a technique of forcibly moving the dilution container to a suction position before washing and sucking the specimen by a sample pipette when a pre-analyzed specimen needs to be retested (see JP 08-194004 A below).

However, in the automatic analyzer described above, when measurement of a plurality of test items is requested for the same sample, some of these test items may need to be retested. Therefore, each test item is assigned in advance to a plurality of dilution containers so that an amount of specimen which is expected to be retested for some test items remains after an initial test. However, if many of the test items assigned to each dilution container require the retest, there is not enough specimen remaining in the assigned dilution container to carry out the measurement of the test items that required these retests, and the retest of some test items may not be possible.

SUMMARY OF THE INVENTION

Therefore, an object of the present invention is to provide an automatic analyzer and an automatic analysis method capable of reliably performing a retest of a plurality of test items using the same diluted sample without wasting the diluted sample.

The present invention is made in considering the above circumstance, and an automatic analyzer includes: a diluted sample holding unit configured to hold a plurality of dilution containers into which a diluted sample obtained by diluting a sample to be tested is dispensed; a reaction container holding unit configured to hold a plurality of reaction containers; a dispensing device configured to dispense the diluted sample from the dilution containers to the reaction containers; a measuring unit configured to perform optical measurement of the diluted sample reacted with reagents corresponding to test items in the reaction containers; a storage unit configured to store information on the diluted sample associated with each of the dilution containers; and a dispensing control unit configured to control a dispensing by the dispensing device, wherein the dispensing control unit extracts a dilution container for collecting the diluted sample for retest among the plurality of dilution containers storing the same diluted sample as a dilution container for retest by searching for the information on the diluted sample stored in the storage unit when retesting a test item for which the necessity of retest has occurred according to a measurement result in an initial test, among a plurality of test items for the same diluted sample, and causes the dispensing device to perform a retest dispensing process of collecting a diluted sample for retest from the extracted dilution container.

According to the present invention, it is possible to reliably perform the retest of the plurality of test items using the same diluted sample without wasting the diluted sample.

DESCRIPTION OF THE INVENTION

Hereinafter, embodiments of an automatic analyzer and an automatic analysis method according to the present invention will be described in detail with reference to the drawings.

<<Automatic Analyzer>>

Figure 1:
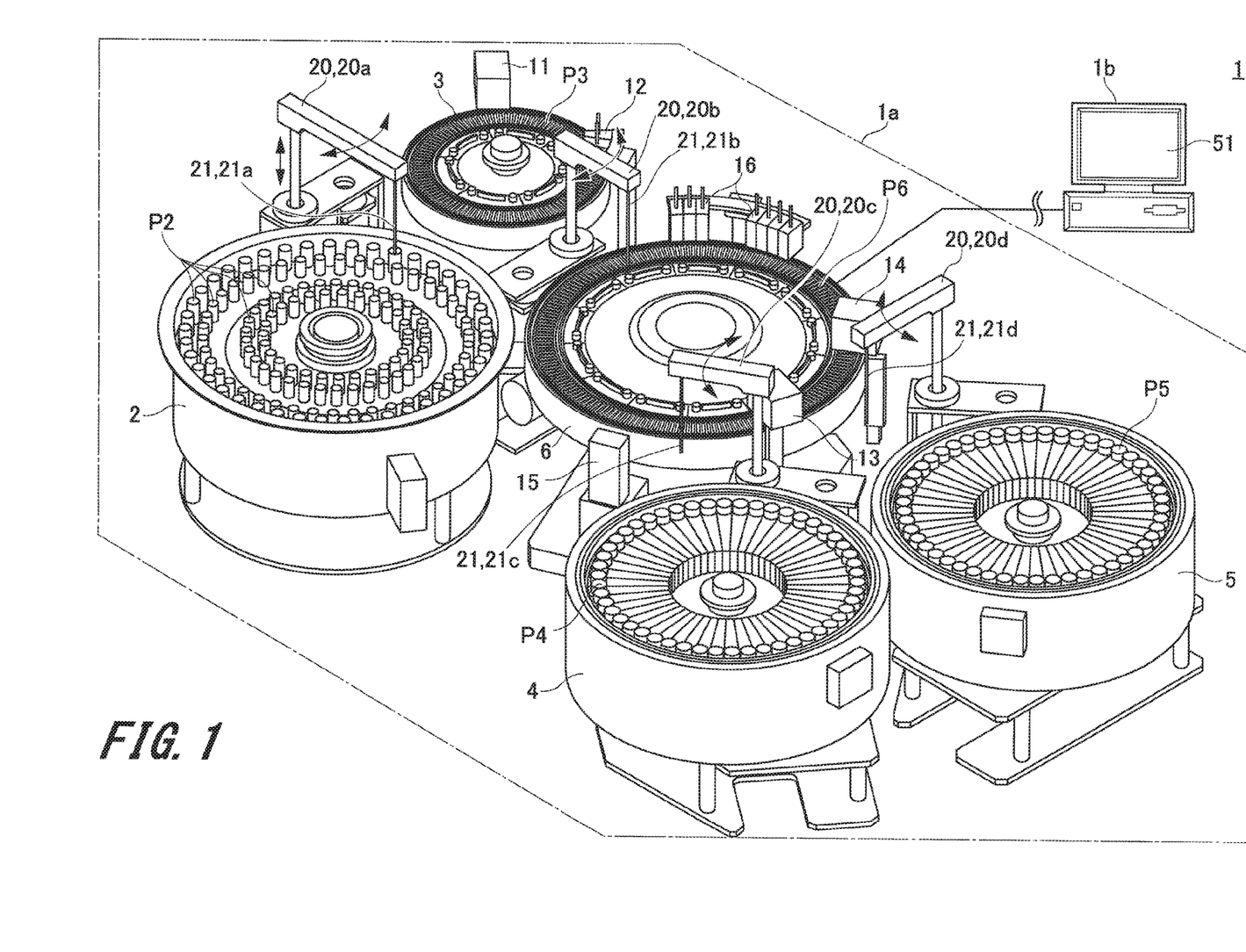
FIG. 1 is a schematic configuration view showing an automatic analyzer according to an embodiment.

FIG. 1 is a schematic configuration view showing an automatic analyzer according to an embodiment, and is a schematic configuration view of an automatic analyzer 1 in which the present invention is applied to a biochemical analyzer that analyzes biological components contained in a sample such as blood or urine as an example. As shown in FIG. 1, the automatic analyzer 1 includes a measurement unit 1a and a control unit 1b.

Among these units, the measurement unit 1a includes, for example, a sample holding unit 2, a diluted sample holding unit 3, a first reagent holding unit 4, a second reagent holding unit 5, and a reaction container holding unit 6. In addition, the measurement unit 1a includes a dilution and stirring device 11, a dilution and cleaning device 12, a first reaction and stirring device 13, a second reaction and stirring device 14, a multi-wavelength photometer 15, and a reaction container cleaning device 16.

Figure 2:
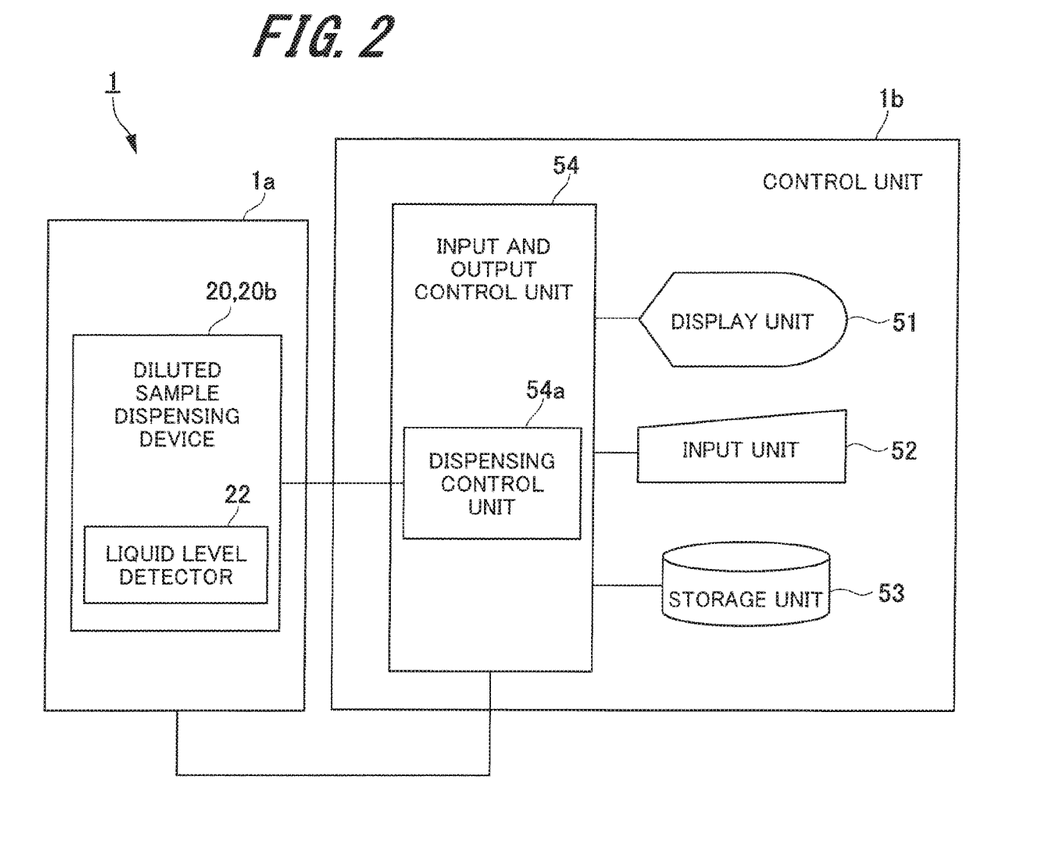
FIG. 2 is a block diagram of the automatic analyzer according to an embodiment.

In addition, the measurement unit 1a includes a plurality of dispensing devices 20. The respective dispensing devices 20 are four dispensing device, for example, a sample dispensing device 20a, a diluted sample dispensing device 20b, a first reagent dispensing device 20c, and a second reagent dispensing device 20d. Each dispensing device 20 includes a dispensing probe 21. FIG. 2 is a block diagram of the automatic analyzer according to an embodiment. As shown in FIG. 2, each dispensing device 20 includes a liquid level detector 22. In addition, FIG. 2 representatively shows a state in which the liquid level detector 22 is provided in the diluted sample dispensing device 20b.

Meanwhile, the control unit 1b includes a display unit 51, an input unit 52, a storage unit 53, and an input and output control unit 54.

Hereinafter, based on FIG. 1 and FIG. 2, details of these components will be described in the order of the measurement unit 1a and the control unit 1b.

<Measurement Unit 1a>

[Sample Holding Unit 2]

The sample holding unit 2 is, for example, in the form of a turntable, configured to hold a plurality of sample containers P2 in a plurality of columns along a peripheral edge thereof and transport the held sample containers P2 in both directions of a circumference. The sample holding unit 2 is rotatably supported along a circumferential direction by a driving mechanism (not shown). Each of the sample containers P2 held by the sample holding unit 2 is one in which a sample to be tested or a control sample for quality management is stored as a dispensing solution. The sample holding unit 2 is configured to hold these various samples at predetermined positions.

In addition, the sample holding unit 2 may hold dilution liquid containers in which a dilution liquid is stored or cleaning containers in which a cleaning liquid is stored as storage containers, in addition to the sample container P2. In addition, the sample holding unit 2 described above may have a function of cooling the held sample containers P2 or other containers.

[Diluted Sample Holding Unit 3]

The diluted sample holding unit is, for example, in the form of a turntable, configured to hold a plurality of dilution containers P3 along a peripheral edge thereof and transport the held dilution containers P3 in both directions of a circumference. The diluted sample holding unit 3 is rotatably supported along a circumferential direction by a driving mechanism (not shown).

The dilution container P3 held by the diluted sample holding unit 3 is one that a sample (hereinafter, referred to as "diluted sample") sucked and diluted from the sample container P2 disposed in the sample holding unit 2 is dispensed, or a sample sucked from the sample container P2 is dispensed as it is, and the dispensed diluted sample or sample is stored. Further, the diluted sample in the following description also includes a sample.

[First Reagent Holding Unit 4 and Second Reagent Holding Unit 5]

The first reagent holding unit 4 is, for example, in the form of a turntable, and holds a plurality of first reagent containers P4 along a peripheral edge thereof. In addition, the second reagent holding unit 5 is, for example, in the form of a turntable, and holds a plurality of second reagent containers P5 along a peripheral edge thereof. In addition, the first reagent holding unit 4 and the second reagent holding unit 5 are configured to transport the held first reagent containers P4 and the held second reagent containers P5, respectively, in both directions of a circumference. The first reagent holding unit 4 and the second reagent holding unit 5 are rotatably supported along a circumferential direction by a driving mechanism (not shown).

The reagent holding unit provided in the automatic analyzer 1 is not limited to two of the first reagent holding unit 4 and the second reagent holding unit 5, and may be one or three or more. When the number of reagent holding units provided in the automatic analyzer 1 is one, a configuration may be provided in which a first reagent dispensing device 20c and a second reagent dispensing device 20d, which will be described later, are provided corresponding to one reagent holding unit.

[Reaction Container Holding Unit 6]

The reaction container holding unit 6 is disposed between the diluted sample holding unit 3, the first reagent holding unit 4, and the second reagent holding unit 5. The reaction container holding unit 6 is, for example, in the form of a turntable, configured to hold a plurality of reaction containers P6 along a peripheral edge thereof and transport the held reaction containers P6 in both directions of a circumference. The reaction container holding unit 6 is rotatably supported along a circumferential direction by a driving mechanism (not shown).

The diluted sample collected from the dilution container P3 of the diluted sample holding unit 3, a first reagent collected from the first reagent container P4 of the first reagent holding unit 4, and a second reagent collected from the second reagent container P5 of the second reagent holding unit 5 are dispensed into the reaction container P6 held by the reaction container holding unit 6 in a predetermined amount, respectively. In the reaction container P6, the diluted sample, the first reagent, and the second reagent are stirred to perform these reactions, or the diluted sample and the first reagent are stirred to perform these reactions. Further, in the reaction container P6, the first reagent and the second reagent to be stirred together with the diluted sample are selected according to the test items to be performed on each sample.

The reaction container holding unit 6 as described above is configured to always keep a temperature of the reaction container P6 constant by a thermostat chamber (not shown).

[Dilution and Stirring Device 11]

The dilution and stirring device 11 is disposed near an outer periphery of the diluted sample holding unit 3. The dilution and stirring device 11 has a stirring mechanism and a driving mechanism for driving the stirring mechanism, and inserts a stirring bar (not shown) into the dilution container P3 held by the diluted sample holding unit 3 to stir the sample and the dilution liquid.

[Dilution and Cleaning Device 12]

The dilution and cleaning device 12 is disposed near the outer periphery of the diluted sample holding unit 3. The dilution and cleaning device 12 is a device for cleaning the dilution container P3 after the diluted sample is sucked by a diluted sample dispensing device 20b described below.

[First Reaction and Stirring Device 13 and Second Reaction and Stirring Device 14]

The first reaction and stirring device 13 and the second reaction and stirring device 14 are disposed near the outer peripheral of the reaction container holding unit 6. The first reaction and stirring device 13 and the second reaction and stirring device 14 stir the diluted sample and the first reagent or the second reagent in the reaction container P6 held by the reaction container holding unit 6. The first reaction and stirring device 13 and the second reaction and stirring device 14 each have a stirring mechanism and a driving mechanism for driving the stirring mechanism, and insert a stirring bar (not shown) into the reaction container P6 held at a predetermined position of the reaction container holding unit 6 to stir the diluted sample and the first reagent or the second reagent. Thereby, the reaction of the diluted sample, the first reagent, and the second reagent is performed.

[Multi-Wavelength Photometer 15]

A multi-wavelength photometer 15 is a measuring unit, and is disposed to face an outer peripheral wall of the reaction container holding unit 6. The multi-wavelength photometer 15 performs optical measurement on the diluted sample reacted with the first reagent and the second reagent corresponding to the test items in the reaction container P6, outputs an amount of various components in the sample as absorbance, and detects a reaction state of the diluted sample.

[Reaction Container Cleaning Device 16]

A reaction container cleaning device 16 is disposed near an outer periphery of the reaction container holding unit 6. The reaction container cleaning device 16 is a device for cleaning the inside of the reaction container P6 for which the test has been completed.

[Sample Dispensing Device 20a]

A sample dispensing device 20a includes a sample probe 21a as a thin tube-like dispensing probe 21, and is disposed near the outer periphery of the sample holding unit 2 and the diluted sample holding unit 3. The sample dispensing device 20a inserts a tip of the sample probe 21a whose axis direction is vertically kept by a driving mechanism (not shown) into the sample in the sample container P2 held by the sample holding unit 2 according to a preset measurement program, and sucks a predetermined amount of sample into the sample probe 21a. In this case, the sample holding unit 2 moves the sample container P2 held at a predetermined position of the sample holding unit 2 to a predetermined sample collection position, according to the preset measurement program.

In addition, the sample dispensing device 20a inserts the tip of the sample probe 21a into the dilution container P3 of the diluted sample holding unit 3, and discharges into the dilution container P3 the sample sucked into the sample probe 21a and a predetermined amount of dilution liquid (e.g., physiological saline) supplied from the sample dispensing device 20a itself. Thereby, the sample is diluted to a predetermined multiple concentration in the dilution container P3.

In addition, the sample dispensing device 20a performs dispensing using a predetermined amount obtained by totaling a predetermined amount of sample and a dilution liquid as a unit amount, and dispenses a multiple of a unit amount of diluted sample into the dilution container P3 within the range of the volume of the dilution container. In this case, when the required amount of the same diluted sample required for measurement exceeds the volume of the dilution container P3, the sample dispensing device 20a dispenses a dispensing amount of a multiple of a unit amount within the range of the volume of the dilution container P3 for one dilution container P3. In addition, for the amount exceeding the dispensing amount of one dilution container P3 of the required amount of the same diluted sample, the sample dispensing device 20a dispenses a dispensing amount of a multiple of a unit amount into a separate dilution container P3.

[Diluted Sample Dispensing Device 20b]

A diluted sample dispensing device 20b is one of the dispensing devices 20, includes a sample probe 21b as a thin tube-like dispensing probe 21, and is disposed between the diluted sample holding unit 3 and the reaction container holding unit 6. The diluted sample dispensing device 20b inserts a tip of the diluted sample probe 21b whose axis direction is vertically kept by a driving mechanism (not shown) into the dilution container P3 of the diluted sample holding unit 3 according to a preset measurement program, and sucks a predetermined amount of diluted sample from the tip of the diluted sample probe 21b filled with system water. In addition, the diluted sample dispensing device 20b inserts the tip of the diluted sample probe 21b into the reaction container P6 of the reaction container holding unit 6, and discharges the diluted sample sucked into the diluted sample probe 21b into the reaction container P6. Thereby, the diluted sample is dispensed from the dilution container P3 to the reaction container P6.

[First Reagent Dispensing Device 20c]

A first reagent dispensing device 20c is one of the dispensing devices 20, includes a first reagent probe 21c as a thin tube-like dispensing probe 21, and is disposed between the reaction container holding unit 6 and the first reagent holding unit 4. The first reagent dispensing device 20c inserts a tip of the first reagent probe 21c whose axis direction is vertically kept by a driving mechanism (not shown) into the first reagent container P4 of the first reagent holding unit 4 according to a preset measurement program, and sucks a predetermined amount of first reagent from the tip of the first reagent probe 21c filled with system water. In addition, the first reagent dispensing device 20c inserts the tip of the first reagent probe 21c into the reaction container P6 of the reaction container holding unit 6, and discharges the first reagent sucked into the first reagent probe 21c into the reaction container P6.

[Second Reagent Dispensing Device 20d]

A second reagent dispensing device 20d is one of the dispensing devices 20, includes a second reagent probe 21d as a thin tube-like dispensing probe 21, and is disposed between the reaction container holding unit 6 and the second reagent holding unit 5. The second reagent dispensing device 20d inserts a tip of the second reagent probe 21d whose axis direction is vertically kept by a driving mechanism (not shown) into the second reagent container P5 of the second reagent holding unit 5 according to a preset measurement program, and sucks a predetermined amount of second reagent from the tip of the second reagent probe 21d filled with system water. In addition, the second reagent dispensing device 20d inserts the tip of the second reagent probe 21d into the reaction container P6 of the reaction container holding unit 6, and discharges the second reagent sucked into the second reagent probe 21d into the reaction container P6.

[Liquid Level Detector 22]

A liquid level detector 22 is a measuring device for detecting a height position of a liquid level with respect to the tip of the dispensing probe 21 in each dispensing device 20, and thereby, a liquid amount in the container provided in each dispensing device 20 can be known. Such a liquid level detector 22 is provided as a liquid amount detector, and for example, a capacitance type one is used, but it is not limited thereto and other types may be used as long as it can detect the liquid amount in the container.

<Control Unit 1b>

A control unit 1b is connected to the driving mechanism of each component, the multi-wavelength photometer 15, and the liquid level detector 22 of each dispensing device 20 that constitute the measurement unit 1a described above. The control unit 1b includes a display unit 51, an input unit 52, a storage unit 53, and an input and output control unit 54. The details of these components are as follows.

[Display Unit 51]

A display unit 51 displays measurement results of the multi-wavelength photometer 15 and also displays various setting information and various history information in the automatic analyzer 1. For example, a liquid crystal display device or the like is used for the display unit 51. In addition, the display unit 51 also serves as an output unit that outputs a notification according to an instruction from a dispensing control unit 54a of an input and output control unit 54 described later. Further, the output unit is not limited to the display unit 51, and may be a speaker whose illustration is omitted here, or may be both the display unit 51 and the speaker.

[Input Unit 52]

An input unit 52 receives an input related to various settings performed by an operator of the automatic analyzer 1 and other inputs, and outputs an input signal to the input and output control unit 54. As the input unit 52, for example, a mouse, a keyboard, a touch panel provided on a display surface of the display unit 51, or the like is used.

[Storage Unit 53]

A storage unit 53 is configured of, for example, a large-capacity recording device such as a hard disk drive (HDD) or a semiconductor memory. The storage unit 53 stores various programs executed by the input and output control unit 54 described later, various setting information for performing a test, and various history information. The information is information stored in the storage unit 53 based on the signal from the input unit 52 or the input and output control unit 54. Among these, the setting information includes, for example, information as shown in Table 1 and Table 2 below. In addition, the various history information includes, for example, information as shown in Table 3 below.

Table 1 below is a table showing sample usage amount information on a usage amount of the diluted sample in the measurement of each of the test items [A] to [D] for the same diluted sample, and includes an initial test usage amount (1), a retest usage amount (2), a retest reservation amount (3), and a required diluted sample amount (4). Here, the same diluted sample is one obtained by diluting the same sample with the same dilution solution under the same dilution condition. Further, as the sample usage amount information, in addition to the items described above, there are fine correction amounts such as the amount of loss generated at the time of dispensing processing, the amount of dummy for dilution container P3 and probe, and the like, but the correction amount are not considered herein in order to simplify the explanation.

TABLE 1

| | test item | [A] | [B] | [C] | [D] |
|---|---|---|---|---|---|
| (1) | initial test usage amount(μl) | 60 | 60 | 60 | 60 |
| (2) | retest usage amount(μl) | 60 | 60 | 60 | 60 |
| (3) | retest reservation amount(μl) | 40 | 40 | 40 | 40 |
| (4) | required diluted sample amount(μl) (1) + (3) | 100 | 100 | 100 | 100 |

The initial test usage amount (1) is an actual usage amount of the diluted sample dispensed from the dilution container P3 to the reaction container P6 by the measurement in an initial test (initial test) for each of the test items [A] to [D]. Here, as an example, the initial test usage amount is set to 60 (μl) in all the test items [A] to [D].

The retest usage amount (2) is an actual usage amount of the diluted sample dispensed from the dilution container P3 to the reaction container P6 by the measurement in a retest (retest) for each of the test items [A] to [D]. The retest usage amount is a value set according to the condition of retest when retest becomes necessary. For this reason, the retest usage amount may be the same as the initial test usage amount (1), but may be smaller or larger than this. If the retest is necessary due to the variation of the test result, the retest usage amount becomes the same as the initial test usage amount (1). In addition, if the retest is necessary due to a concentration of the diluted sample, the retest usage amount is a value smaller or larger than the initial usage amount (1). Here, as an example, the retest usage amount is set to 60 (μl) which is equal to the initial test in all the test items [A] to [D].

The retest reservation amount (3) is a liquid amount of the diluted sample to be stored in excess in the dilution container P3 in anticipation of the need for retesting for each of the test items [A] to [D]. Usually, the probability of retest is not very high. Therefore, by assigning an amount smaller than the retest usage amount (2) to the retest reservation amount and adding the retest reservation amounts of a plurality of test items [A] to [D], the retest usage amount of several items in which the retest actually occurs is secured. Thereby, a usage amount of sample is suppressed.

The required diluted sample amount (4) is a diluted sample amount assigned to each of the test items [A] to [D], and is the total amount of initial usage amount (1) and retest reservation amount (3).

Table 2 below shows information for each container on each of the dilution containers [P3-1] and [P3-2] that store the same diluted sample, and also includes information on the diluted sample associated with each dilution container P3. Such information for each container is information for each container including a dispensing amount (5), an initial test assignment test item (6), a total usage amount of initial test (7), and a residual liquid amount after initial test (8).

TABLE 2

| dilution container P3 | [P3-1] | [P3-2] |
|---|---|---|
| (5) dispensing amount(μl) | 300 | 150 |
| (6) initial test assignment test item | [A], [B], [C] | [D] |
| (7) total usage amount of initial test(μl) | 180 | 60 |
| (8) residual liquid amount after initial test(μl) | 120 | 90 |

The dispensing amount (5) is the amount of diluted sample dispensed to each dilution container P3. The dispensing amount is a multiple of the unit amount within the range of the volume of the dilution container P3. Here, as an example, the volume of the dilution container P3 is set to 300 (μl) and the unit amount is set 150 (μl). The unit amount is a value determined by a limit weighing with which weighing accuracy of the dispensing device 20 is secured, and a dilution condition of the sample. For example, if the limit weighting of the sample dispensing device 20a is 30 (μl) and the dilution condition is a dilution of five time, 150 (μl) becomes the unit amount obtained by adding the diluted liquid of 120 (μl) to the sample 30 (μl) and diluting it in five times.

In the example shown here, for the volume 300 (μl) of the dilution container P3, the total of the required diluted sample amount (4) of each of the test items [A] to [D] is [100×4=400 (μl)]. For this reason, the dilution liquid having the dispensing amount of 300 (μl), which is double of the unit amount 150 (μl), is dispensed into one dilution container [P3-1], and the dilution liquid having the dispensing amount of 150 (μl), which is one time of the unit amount of 150 (μl) is dispensed into the other dilution container [P3-2].

The initial test assignment test item (6) is an assignment of test items [A] to [D] for collecting the diluted sample at the initial test to the dilution containers [P3-1] and [P3-2]. The test items [A] to [D] are assigned to the dilution containers [P3-1] and [P3-2] so that the total of the required diluted sample amounts (4) falls within the range of dispensing amount (5) of the dilution containers [P3-1] and [P3-2].

The total usage amount of initial test (7) is the total amount of the initial usage amount (1) for each of the test items [A] to [D] assigned to each of the dilution containers [P3-1] and [P3-2].

The residual liquid amount after initial test (8) is a stored amount of the diluted sample remaining in each of the dilution containers [P3-1] and [P3-2] after the initial test of each of the test items [A] to [D] is completed. The residual liquid amount is a value calculated by the dispensing control unit 54a described below.

Table 3 below shows history information for each container on each of the dilution containers [P3-1] and [P3-2] that store the same diluted sample, and includes information on the diluted sample associated with each dilution container P3. Such history information for each container is history information for each container including a retest assignment test item (11), a total usage amount of retest (12), and a residual liquid amount (13).

TABLE 3

| dilution container P3 | [P3-1] | [P3-2] |
|---|---|---|
| (11) retest assignment test item | — | — |
| (12) total usage amount of retest(μl) | 0 | 0 |
| (13) residual liquid amount(μl) | 120 | 90 |

The retest assignment test item (11) is an assignment of test items [A] to [D] for collecting the diluted sample by the retest of the dilution containers [P3-1] and [P3-2], and is sequentially assigned according to an automatic analysis method described below.

The total usage amount of retest (12) is the total amount of the retest usage amount (2) for each of the test items [A] to [D] assigned to each of the dilution containers [P3-1] and [P3-2] at the time of retesting, and is a value to be updated.

The residual liquid amount (13) is a stored amount of the diluted sample remaining in each of the dilution containers [P3-1] and [P3-2] after each retest requested for the test items [A] to [D] is completed. The residual liquid amount is a value updated by an execution of the dispensing process, and is a value calculated each time the dispensing process is performed by the dispensing control unit 54a described later.

[Input and Output Control Unit 54]

An input and output control unit 54 is configured by a computer such as a microcomputer. The computer includes storage units such as a central processing unit (CPU), a read only memory (ROM), and a random access memory (RAM), and controls the operation of each unit in the automatic analyzer 1. The storage unit such as the ROM and the RAM may be the storage unit 53.

The input and output control unit 54 can determine the necessity of retest based on the measurement result of the multi-wavelength photometer 15, for example, and may perform a control for automatically performing the retest using the diluted sample remaining in the dilution container P3. Such an input and output control unit 54 includes a dispensing control unit 54a for controlling the driving of the diluted sample dispensing device 20b particularly when performing the retest. The dispensing control unit 54a controls the driving of the diluted sample holding unit 3 and the diluted sample dispensing device 20b based on the input from the input unit 52 and the information stored in the storage unit 53 when performing the retest. The control of the driving of the diluted sample dispensing device 20b by the dispensing control unit 54a will be described in detail in the following automatic analysis method.

<<First Example of Automatic Analysis Method>>

Figure 3:
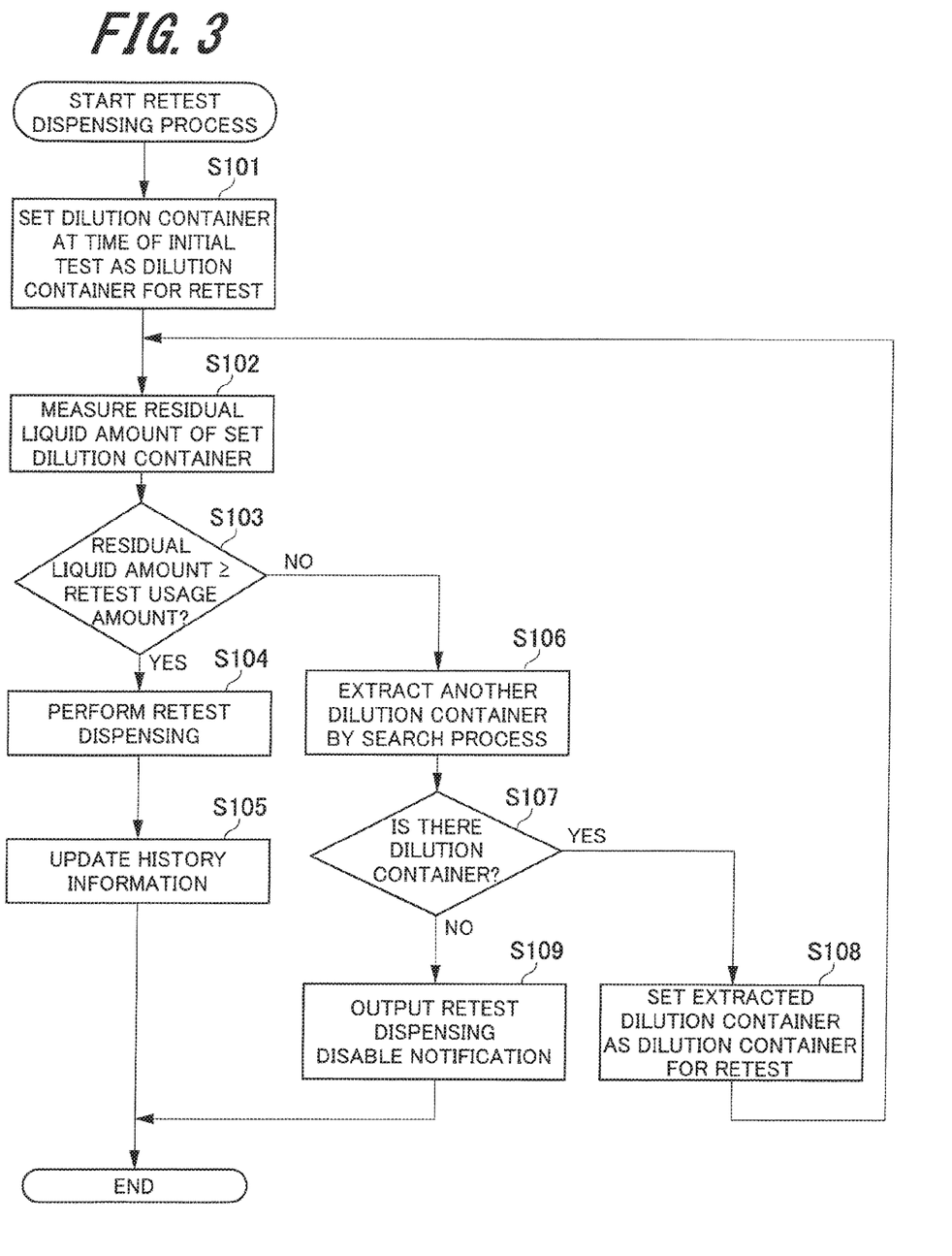
FIG. 3 is a flowchart showing a first example of an automatic analysis method using an automatic analyzer according to an embodiment.

FIG. 3 is a flowchart showing a first example of an automatic analysis method using an automatic analyzer 1 according to an embodiment. The automatic analysis method described with reference to FIG. 3 is a procedure applied to the dispensing process of the diluted sample in the case in which the retest is necessary according to the result when the initial test is performed by a normal measurement operation for the test items [A] to [D] for the same diluted sample.

The procedure is initiated by triggering an input relating to a request of the retest from the input unit 52 or a request of the retest generated by the input and output control unit 54, and is realized by the CPU constituting the input and output control unit 54 described with reference to FIG. 2 executing a program stored in the storage unit 53.

Hereinafter, a procedure of the first example of the automatic analysis method performed by the input and output control unit 54 of the automatic analyzer 1 will be described with reference to FIGS. 1 and 2 in the order shown in the flowchart of FIG. 3. Thereafter, retest dispensing processes in which the procedure of the first example is applied to the above-described test items [A] to [D] will be described.

Procedure of First Example

[Step S101]

In step S101, the dispensing control unit 54a sets the dilution container at the time of the initial test of the test item for which the retest has been requested as a dilution container for retest for collecting a diluted sample for retest of the test item. In this case, the dispensing control unit 54a acquires information of the dilution container which is set at the time of the initial test for the test item for which the retest has been requested, based on the information for each container shown in Table 2 of the information stored in the storage unit 53. In addition, the dilution container assigned at the time of the initial test is set as the dilution container for retest for which the diluted sample is to be collected at the time of the retest of the test item.

[Step S102]

In step S102, the dispensing control unit 54a instructs the liquid level detector 22 of the diluted sample dispensing device 20b to measure the residual liquid amount of the diluted sample in the dilution container set as the dilution container for retest, and executes the measurement. In this case, the dispensing control unit 54a first causes the diluted sample holding unit 3 to transfer the dilution container set as the dilution container for retest to a position accessible by the diluted sample dispensing device 20b, and then causes the liquid level detector 22 to measure the residual liquid amount of the diluted sample in the set dilution container.

[Step S103]

In step S103, the dispensing control unit 54a determines whether or not the residual liquid amount measured in step S102 is equal to or more than the retest usage amount of the test item for which the retest has been requested. In this case, the dispensing control unit 54a performs the determination based on the residual liquid amount measured in step S102 and the retest usage amount (2) in the sample usage information shown in Table 1 of the setting information stored in the storage unit 53. In addition, if it is determined that the residual liquid amount is equal to or more than the retest usage amount (2) (YES), the procedure proceeds to step S104, and if it is determined that the residual liquid amount is less than the retest usage amount (2) (NO), the procedure proceeds to step S106. Further, the retest usage amount (2) is automatically set according to the measurement result of the initial test when the retest is requested. In this case, for example, the input and output control unit 54 sets a dilution ratio of the sample at the time of the retest according to the measurement result of the initial test, and automatically sets the retest usage amount based on the set dilution ratio at the time of the retest.

[Step S104]

In step S104, the dispensing control unit 54a performs dispensing for retest of the test item for which the retest has been requested. In this case, the diluted sample is collected from the dilution container set as the dilution container for retest. In addition, the diluted sample is collected from the set dilution container according to the retest usage amount set for the test item, and the collected diluted sample is discharged to the reaction container P6. Thereafter, the procedure proceeds to step S105.

[Step S105]

In step S105, the dispensing control unit 54a updates the history information for each container shown in Table 3 stored in the storage unit 53. Here, the updated history information for each container is the retest assignment test item (11), the total usage amount of retest (12), and the residual liquid amount (13) shown in Table 3. The residual liquid amount is calculated based on the information stored in the storage unit 53 and the usage amount of the diluted sample collected from the dilution container in the retest dispensing process of step S104.

[Step S106]

Meanwhile, in step S106, the dispensing control unit 54a searches for and extracts a dilution container other than the dilution container set as the dilution container for retest. In this case, the dispensing control unit 54a searches for information on another dilution container in which the same diluted sample as the diluted sample used in the test item requested to be retested is stored, of the information stored in the storage unit 53.

When a plurality of other dilution containers are extracted by the search, the dispensing control unit 54a extracts another dilution container having the maximum residual liquid amount, based on the residual liquid amount (13) shown in Table 3 stored in the storage unit 53. Alternatively, the dispensing control unit 54a may extract only one other dilution container in the order set in advance.

[Step S107]

Thereafter, in step S107, the dispensing control unit 54a determines whether or not there is another corresponding dilution container as a result of the search process in step S106. If the dispensing control unit 54a determines that there is another dilution container (YES), the procedure proceeds to step S108, and if the dispensing control unit 54a determines that there is no another dilution container (NO), the procedure proceeds to step S109.

[Step S108]

In step S108, the dispensing control unit 54a changes the information of the dilution container set as the dilution container for retest to information of another dilution container extracted in the search of step S106. Thereafter, the procedure proceeds to step S102, and is repeated.

[Step S109]

Meanwhile, in step S109, the dispensing control unit 54a instructs the display unit 51 to output a retest disable notification. Thereby, the display unit 51 performs a display to notify that there is no dilution container in which a sufficient amount of diluted sample has been stored to perform the retest on the test item, and the retest cannot be performed. Thereafter, the series of processes is ended.

Application of First Example

Next, retest dispensing processes in which the procedure of the first example is applied to the test items [A] to [D] described above will be described. Here, for example, cases where the retest is requested for the test items [A], [B], and [C] will be described based on the result of the initial test after the initial test is performed for the test items [A] to [D] described above. The request for retest is in the order of test items [A], [B], and [C].

[Retest Dispensing of Test Item [A]]

As the retest for the test item [A] is first requested after the initial test is completed, according to step S101, the dilution container [P3-1] assigned at the time of the initial test of the test item [A] as shown in Table 2 is set as the dilution container for retest of the test item [A].

Next, according to step S102, the residual liquid amount in the dilution container [P3-1] set in step S101 is measured by the liquid level detector 22 of the diluted sample dispensing device 20b.

Thereafter, according to step S103, it is determined whether the residual liquid amount measured in step S102 is equal to or more than a retest usage amount of the test item [A]. Here, as shown in the residual liquid amount (13) of Table 3, the residual liquid amount of the dilution container [P3-1] in calculation is 120 (μl). Therefore, the liquid level detector 22 of the diluted sample dispensing device 20b measures the residual liquid amount of the dilution container [P3-1] as a value of about 120 (μl). In addition, as shown in the retest usage amount (2) of Table 1, since the retest usage amount (2) of the test item [A] is 60 (μl), it is determined that the residual liquid amount of 120 (μl) is equal to or more than the retest usage amount (2) of 60 (μl) of the test item [A] (YES), and the procedure proceeds to step S104.

Next, according to step S104, a dispensing process for retest of the test item [A] is performed for the dilution container [P3-1] set as the retest dilution container, and thereafter, according to step S105, the history information for each container stored in the storage unit 53 is updated.

Table 4 below shows the history information for each container updated in step S105. As shown in Table 4, in a step in which the test item [A] requested to be retested as the retest assignment test item (11) is additionally assigned to the dilution container [P3-1] and the retest dispensing of the test item [A] ends, the total usage amount of retest (12) is 60 (μl) for the dilution container [P3-1] and 0 (μl) for the dilution container [P3-2]. In addition, the residual liquid amount after retest (13) in calculation is 60 (μl) for the dilution container [P3-1] and 90 (μl) for the dilution container [P3-2].

TABLE 4

| dilution container P3 | [P3-1] | [P3-2] |
| --- | --- | --- |
| (11) retest assignment test item | [A] | — |
| (12) total usage amount of retest(μl) | 60 | 0 |
| (13) residual liquid amount(μl) | 60 | 90 |

[Retest Dispensing of Test Item [B]]

Next, in a state shown in Table 4, as a retest for the next test item [B] is requested, according to step S101, the dilution container [P3-1] assigned at the time of the initial test of the test item [B] as shown in Table 2 is set as a dilution container for retest of the test item [B].

Next, according to step S102, the residual liquid amount in the dilution container [P3-1] set in step S101 is measured by the liquid level detector 22 of the diluted sample dispensing device 20b.

Thereafter, according to step S103, it is determined whether the residual liquid amount measured in step S102 is equal to or more than a retest usage amount of the test item [B]. Here, as shown in the residual liquid amount (13) after retest of Table 4, the residual liquid amount of the dilution container [P3-1] in calculation at this point is 60 (μl). Therefore, the liquid level detector 22 of the diluted sample dispensing device 20b measures the residual liquid amount of the dilution container [P3-1] as a value of about 60 (μl). In addition, as shown in the retest usage amount (2) of Table 1, since the retest usage amount (2) of the test item [B] is 60 (μl), it is determined herein, for example, that the residual liquid amount of 60 (μl) is equal to or more than the retest usage amount of 60 (μl) of the test item [B] (YES), and the procedure proceeds to step S104.

Next, according to step S104, a dispensing process for retest of the test item [B] is performed for the dilution container [P3-1] set as the retest dilution container, and thereafter, according to step S105, the history information for each container stored in the storage unit 53 is updated.

Table 5 below shows the history information for each container updated in step S105. As shown in Table 5, in a step in which the test item [B] as the retest assignment test item (11) is additionally assigned to the dilution container [P3-1] and the retest dispensing of the test item [B] ends, the total usage amount of retest (12) is 120 (μl) for the dilution container [P3-1] and 0 (μl) for the dilution container [P3-2]. In addition, the residual liquid amount after retest (13) in calculation is 0 (μl) for the dilution container [P3-1] and 90 (μl) for the dilution container [P3-2].

TABLE 5

| dilution container P3 | [P3-1] | [P3-2] |
|---|---|---|
| (11) retest assignment test item | [A], [B] | — |
| (12) total usage amount of retest(μl) | 120 | 0 |
| (13) residual liquid amount(μl) | 0 | 90 |

[Retest Dispensing of Test Item [C]]

Next, in a state shown in Table 5, as a request of retest for the next test item [C] is input, according to step S101, the dilution container [P3-1] assigned at the time of the initial test of the test item [C] as shown in Table 2 is set as a retest dilution container of the test item [C].

Next, according to step S102, the residual liquid amount in the dilution container [P3-1] set in step S101 is measured by the liquid level detector 22 of the diluted sample dispensing device 20b.

Thereafter, according to step S103, it is determined whether the residual liquid amount measured in step S102 is equal to or more than a retest usage amount of the test item [C]. Here, as shown in the residual liquid amount after retest (13) of Table 5, the residual liquid amount of the dilution container [P3-1] in calculation at this point is 0 (μl). Therefore, the liquid level detector 22 of the diluted sample dispensing device 20b measures the residual liquid amount of the dilution container [P3-1] as a value of about 0 (μl). In addition, as shown in the retest usage amount (2) of Table 1, since the retest usage amount of the test item [C] is 60 (μl), it is determined that the residual liquid amount of 0 (μl) is less than the retest usage amount of 60 (μl) of the test item [C] (NO), and the procedure proceeds to step S106.

Next, according to step S106, another dilution container search process is performed. Thereby, a dilution container [P3-2], which is a dilution container different from the dilution container set as the dilution container for retest and in which the same diluted sample as the diluted sample used in the test item [C] is stored, is extracted.

Thereafter, according to step S107, it is determined whether or not there is another dilution container. Here, it is determined that there is another dilution container [P3-2] (YES), and the procedure proceeds to step S108.

In addition, according to step S108, the setting of the dilution container for retest used in the retest of the test item [C] is changed from the dilution container [P3-1] to another dilution container [P3-2] extracted in step S106.

Thereafter, according to step S102, the residual liquid amount in the set dilution container [P3-2] is measured by the liquid level detector 22 of the diluted sample dispensing device 20b, and thereafter, according to step S103, it is determined whether or not the residual liquid amount measured in step S102 is equal to or more than the retest usage amount of the test item [C]. Here, as shown in the residual liquid amount after retest (13) of Table 5, the residual liquid amount of the dilution container [P3-2] in calculation is 90 (μl). Therefore, the liquid level detector 22 of the diluted sample dispensing device 20b measures the residual liquid amount of the dilution container [P3-2] as a value of about 90 (μl). In addition, as shown in the retest usage amount (2) of Table 1, since the retest usage amount of the test item [C] is 60 (μl), it is determined that the residual liquid amount of 90 (μl) is equal to or more than the retest usage amount of 60 (μl) of the test item [C] (YES), and the procedure proceeds to step S104 to perform the retest dispensing. Thereafter, according to step S105, the history information for each container stored in the storage unit 53 is updated.

Table 6 below shows the history information for each container updated in step S105. As shown in Table 6, in a step in which the retest of the test item [C] as the retest assignment test item (11) is additionally assigned to the dilution container [P3-2] and the retest dispensing of the test item [C] ends, the total usage amount of retest (12) is 120 (μl) for the dilution container [P3-1] and 60 (μl) for the dilution container [P3-2]. In addition, the residual liquid amount after retest (13) in calculation is 0 (μl) for the dilution container [P3-1] and 30 (μl) for the dilution container [P3-2].

TABLE 6

| dilution container P3 | [P3-1] | [P3-2] |
|---|---|---|
| (11) retest assignment test item | [A], [B] | [C] |
| (12) total usage amount of retest(μl) | 120 | 60 |
| (13) residual liquid amount(μl) | 0 | 30 |

As described above, all the dispensing processes for the retest on the test items [A], [B], and [C] to which the request for retest is input among the test items [A] to [D] are completed.

Effect of First Example

According to the first example of the embodiment described above, when a sufficient amount of diluted sample does not remain in the dilution container set as the dilution container for retest for collecting the diluted sample for retest, the diluted sample can be collected from another dilution container in which the same diluted sample is stored by the search process of the information stored in the storage unit 53. Therefore, it becomes possible to use for retest without wasting the diluted sample in the plurality of dilution containers in which the same diluted sample is stored. As a result, it becomes possible to reliably perform the retest of the plurality of test items using the same diluted sample without wasting the diluted sample.

Second Example of Automatic Analysis Method

Figure 4:
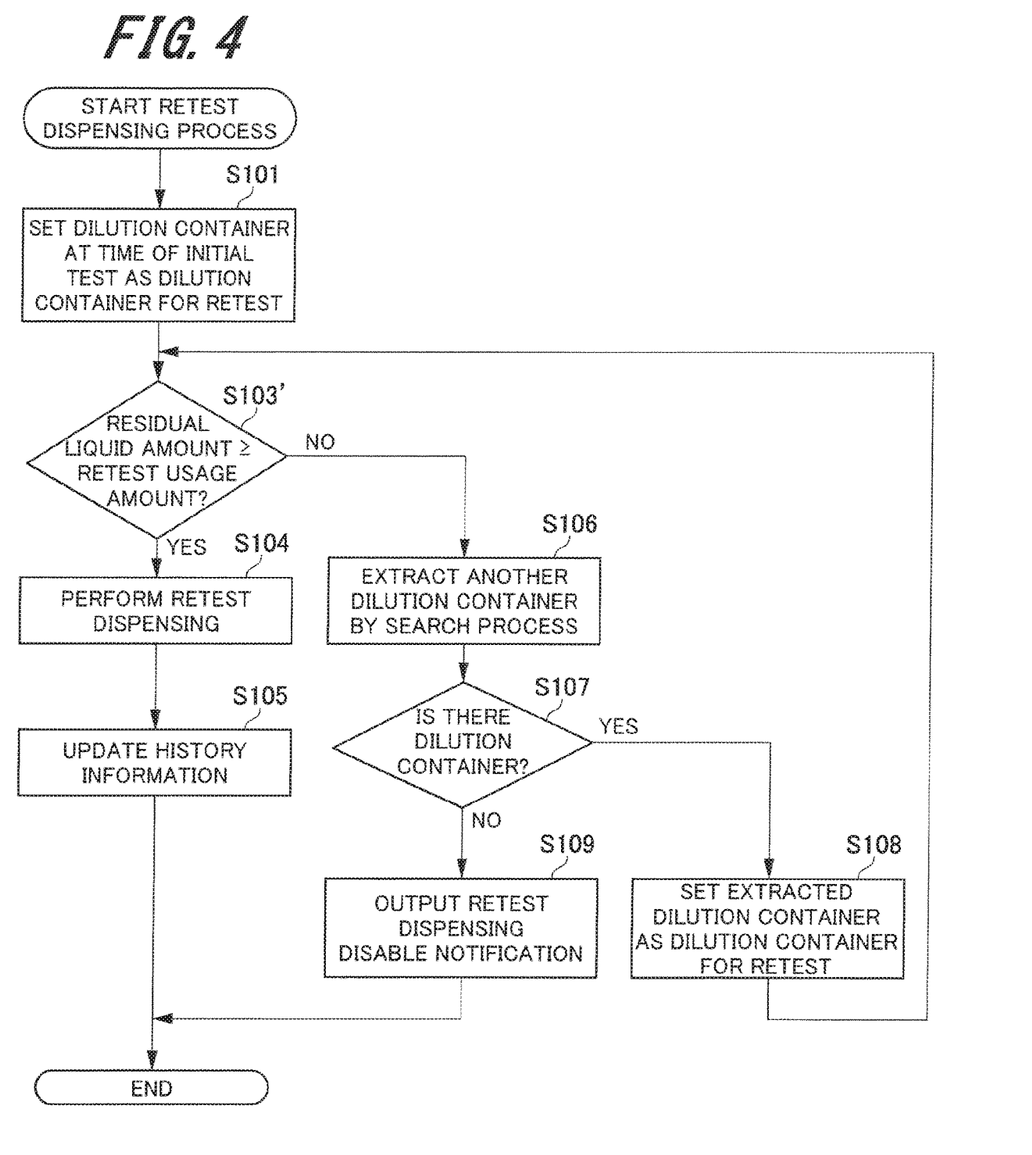
FIG. 4 is a flowchart showing a second example of an automatic analysis method using an automatic analyzer according to an embodiment.

FIG. 4 is a flowchart showing a second example of an automatic analysis method using an automatic analyzer 1 according to an embodiment. The automatic analysis method to be described with reference to FIG. 4 is different from the first example shown in FIG. 3 in step S103' in which a residual liquid amount of the diluted sample is compared and determined. The other steps are the same as in the first example.

Hereinafter, a procedure of the second example of the automatic analysis method performed by the input and output control unit 54 of the automatic analyzer 1 will be described with reference to FIGS. 1 and 2 in the order shown in the flowchart of FIG. 4. Thereafter, retest dispensing processes in which a flow of the second example is applied to the above-described test items [A] to [D] will be described. Further, in the following, the detailed description of the same steps as in the first example will be omitted.

Procedure of Second Example

[Step S101]

In step S101, as in the first example, the dispensing control unit 54a sets the dilution container at the time of the initial test of the test item for which the retest has been requested as a dilution container for retest for collecting a diluted sample for retest of a retest item. Thereafter, the procedure proceeds to step S103'.

[Step S103']

Next, in step S103', the dispensing control unit 54a determines whether or not the residual liquid amount calculated from the information stored in the storage unit 53 is equal to or more than the retest usage amount of the test item for which the retest has been requested, for the dilution container set as the dilution container for retest. In this case, the dispensing control unit 54a performs the determination based on the residual liquid amount (13) in the history information for each container shown in Table 3 and the retest usage amount in the sample usage amount (2) information shown in Table 1 of the setting information stored in the storage unit 53. In addition, if it is determined that the residual liquid amount is equal to or more than the retest usage amount (YES), the procedure proceeds to step S104, and if it is determined that the residual liquid amount is less than the retest usage amount (NO), the procedure proceeds to step S106.

[Step S104 to Step S109]

Steps S104 to S109 are performed in the same manner as in the first example.

Application of Second Example

Retest dispensing processes in which the procedure of the second example is applied to the test items [A] to [D] described above are different from the retest dispensing processes to which the procedure of the first example is applied only in a fact that the determination in step S103' is performed based on the information stored in the storage unit 53 and the calculated information. Therefore, the retest dispensing processes of the cases where the retest is requested for the test items [A], [B], and [C] based on the result of the initial test after the initial test is performed for the test items [A] to [D] described above are performed in the same manner as the retest dispensing processes to which the procedure of the first example is applied.

Effect of Second Example

In the second example of the embodiment described above, the determination as to whether or not a sufficient amount of diluted sample remains in the dilution container set as the dilution container for retest for collecting the diluted sample for retest with respect to the first example above is performed based on the information stored in the storage unit 53. For this reason, compared with the first example, the determination may be performed without actually measuring the residual liquid amount of the diluted sample in the dilution container. As a result, in addition to the effect of the first example, an effect of achieving the speeding up of the retest dispensing process can be obtained.

Third Example of Automatic Analysis Method

Figure 5:
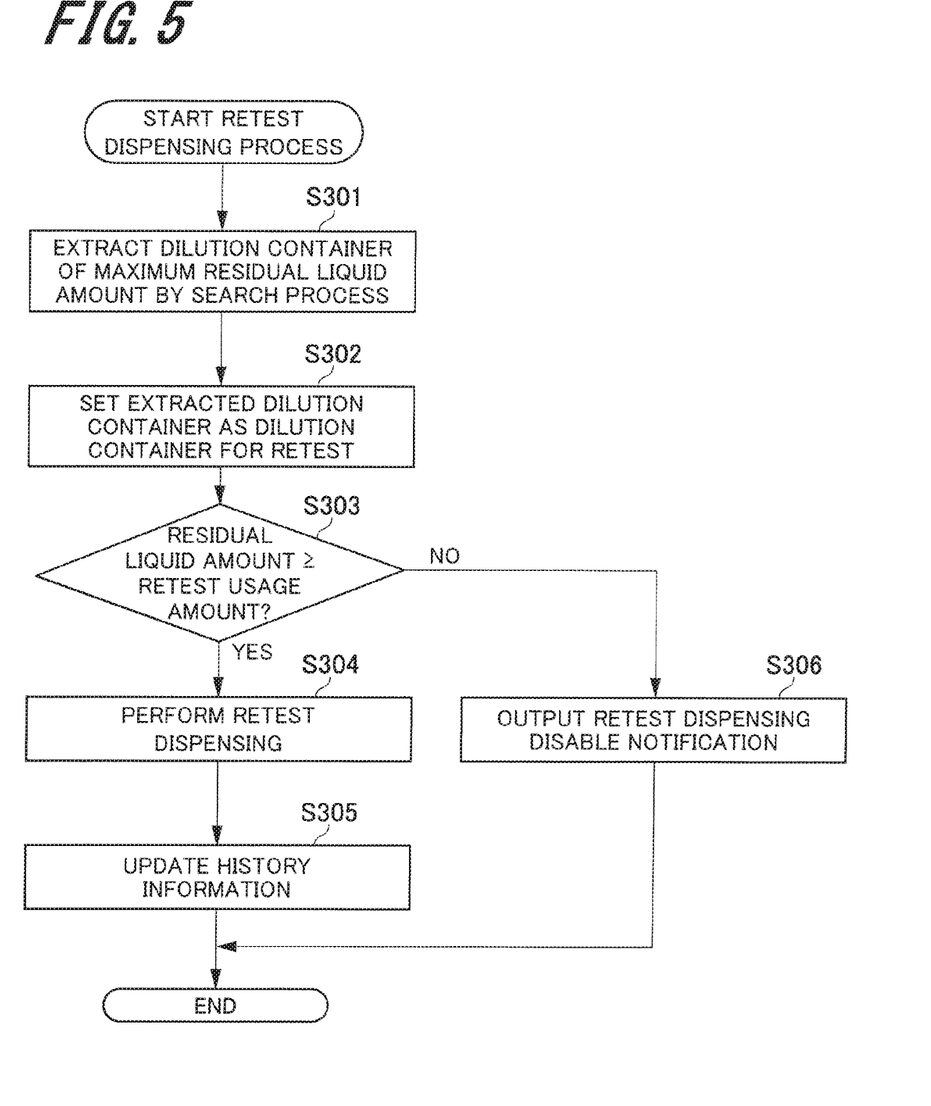
FIG. 5 is a flowchart showing a third example of an automatic analysis method using an automatic analyzer according to an embodiment.

FIG. 5 is a flowchart showing a third example of an automatic analysis method using an automatic analyzer 1 according to an embodiment. The automatic analysis method described with reference to FIG. 3 is a procedure applied to the dispensing process of the diluted sample in the case in which the retest is necessary according to the result when the initial test is performed by a normal measurement operation for the test items [A] to [D] for the same diluted sample.

The procedure is initiated by triggering an input relating to a request of the retest from the input unit 52 or a request of the retest generated by the input and output control unit 54, and is realized by the CPU constituting the input and output control unit 54 described with reference to FIG. 2 executing a program stored in the storage unit 53.

Hereinafter, a procedure of the third example of the automatic analysis method performed by the input and output control unit 54 of the automatic analyzer 1 will be described with reference to FIGS. 1 and 2 in the order shown in the flowchart of FIG. 5. Thereafter, retest dispensing processes in which the procedure of the third example is applied to the above-described test items [A] to [D] will be described.

Procedure of Third Example

[Step S301]

In step S301, the dispensing control unit 54a searches for information on the dilution container in which the same diluted sample as the diluted sample of the test item requested for which the retest has been requested, and performs a process of extracting the dilution container of the maximum residual liquid amount. In this case, the dispensing control unit 54a extracts a dilution container having the maximum residual liquid amount of the same diluted sample, based on the history information for each container among the information stored in the storage unit 53.

[Step S302]

In step S302, the dispensing control unit 54a sets the dilution container of the maximum residual liquid amount extracted in step S301 as the dilution container for retest.

[Step S303]

In step S303, the dispensing control unit 54a determines whether or not the residual amount of the dilution container set as the dilution container for retest is equal to or more than the retest usage amount of the test item for which the retest has been requested. In this case, the dispensing control unit 54a performs the determination based on the information on the dilution container of the maximum residual liquid amount obtained in step S301. In addition, if it is determined that the residual liquid amount is equal to or more than the retest usage amount (YES), the procedure proceeds to step S304, and if it is determined that the residual liquid amount is less than the retest usage amount (NO), the procedure proceeds to step S306.

[Step S304]

In step S304, the dispensing control unit 54a performs dispensing for retest of the test item for which the retest has been requested. In this case, the diluted sample is collected from the dilution container set as the dilution container for retest. In addition, the diluted sample is collected from the set dilution container according to the retest usage amount set for the test item, and the collected diluted sample is discharged to the reaction container P6 to end the dispending. Thereafter, the procedure proceeds to step S305.

[Step S305]

In step S305, the dispensing control unit 54a updates the history information for each container shown in Table 3 stored in the storage unit 53. Here, the updated history information for each container is the retest assignment test item (11), the total usage amount of retest (12), and the residual liquid amount (13).

[Step S306]

Meanwhile, in step S306, the dispensing control unit 54a instructs the display unit 51 to output a retest disable notification. Thereby, the display unit 51 performs a display to notify that there is no dilution container in which a sufficient amount of diluted sample has been stored to perform the retest on the test item, and the retest cannot be performed. Thereafter, the series of processes is ended.

Application of Third Example

Next, retest dispensing processes in which the procedure of the third example is applied to the test items [A] to [D] described above will be described. Here, for example, cases where the retest is requested for the test items [A], [B], and [C] will be described based on the result of the initial test after the initial test is performed for the test items [A] to [D] described above. The request for retest is in the order of test items [A], [B], and [C].

[Retest Dispensing of Test Item [A]]

After completion of the initial test, the request for retest for the test item [A] is first input, and according to step S301, the extraction process of the dilution container of the maximum residual liquid amount is performed. Here, the dilution container [P3-1] having the maximum residual liquid amount is extracted by the search among the dilution containers [P3-1] and [P3-2] in which the same diluted sample is stored, based on the history information for each container shown in Table 3 stored in the storage unit 53.

Next, according to step S302, as a dilution container for retest to collect the diluted sample when performing the retest of the test item [A], the dilution container [P3-1] of the maximum residual liquid amount extracted in step S301 is set.

Thereafter, according to step S303, it is determined whether the residual liquid amount of the extracted dilution container [P3-1] is equal to or more than the retest usage amount of the test item [A]. Here, as shown in the residual liquid amount (13) of Table 3, the residual liquid amount of the dilution container [P3-1] in calculation is 120 (μl). In addition, as shown in the retest usage amount (2) of Table 1, since the retest usage amount (2) of the test item [A] is 60 (μl), it is determined that the residual liquid amount of 120 (μl) is equal to or more than the retest usage amount (2) of 60 (μl) of the test item [A] (YES), and the procedure proceeds to step S304.

Next, according to step S304, a dispensing process for retest of the test item [A] is performed for the dilution container [P3-1] set as the dilution container for retest, and thereafter, according to step S305, the history information for each container stored in the storage unit 53 is updated.

Table 7 below shows the history information for each container updated in step S305. As shown in Table 7, in a step in which the test item [A] requested to be retested as the retest assignment test item (11) is additionally assigned to the dilution container [P3-1] and the retest dispensing of the test item [A] ends, the total usage amount of retest (12) is 60 (μl) for the dilution container [P3-1] and 0 (μl) for the dilution container [P3-2]. In addition, the residual liquid amount after retest (13) in calculation is 60 (μl) for the dilution container [P3-1] and 90 (μl) for the dilution container [P3-2].

TABLE 7

| dilution container P3 | [P3-1] | [P3-2] |
|---|---|---|
| (11) retest assignment test item | [A] | — |
| (12) total usage amount of retest(μl) | 60 | 0 |
| (13) residual liquid amount after retest(μl) | 60 | 90 |

[Retest Dispensing of Test Item [B]]

Next, in the state shown in Table 7, when the request of the retest for a next test item [B] is input, the extraction process of the dilution container of the maximum residual liquid amount is performed according to step S301. Here, the dilution container [P3-2] having the maximum residual liquid amount is extracted by the search among the dilution containers [P3-1] and [P3-2] in which the same diluted sample is stored, based on the history information for each container shown in Table 7 stored in the storage unit 53.

Next, according to step S302, as a dilution container for retest to collect the diluted sample when performing the retest of the test item [B], the dilution container [P3-2] of the maximum residual liquid amount extracted in step S301 is set.

Thereafter, according to step S303, it is determined whether the residual liquid amount of the extracted dilution container [P3-2] is equal to or more than the retest usage amount of the test item [B]. Here, as shown in the residual liquid amount (13) of Table 7, the residual liquid amount of the dilution container [P3-2] in calculation is 90 (μl). In addition, as shown in the retest usage amount (2) of Table 1, since the retest usage amount (2) of the test item [B] is 60 (μl), it is determined that the residual liquid amount of 90 (μl) is equal to or more than the retest usage amount (2) of 60 (μl) of the test item [B] (YES), and the procedure proceeds to step S304.

Next, according to step S304, a dispensing process for retest of the test item [B] is performed for the dilution container [P3-2] set as the dilution container for retest, and thereafter, according to step S305, the history information for each container stored in the storage unit 53 is updated.

Table 8 below shows the history information for each container updated in step S305. As shown in Table 8, in a step in which the test item [B] requested to be retested as the retest assignment test item (11) is additionally assigned to the dilution container [P3-2] and the retest dispensing of the test item [B] ends, the total usage amount of retest (12) is 60 (μl) for the dilution container [P3-1] and 60 (μl) for the dilution container [P3-2]. In addition, the residual liquid amount after retest (13) in calculation is 60 (μl) for the dilution container [P3-1] and 30 (μl) for the dilution container [P3-2].

TABLE 8

| dilution container P3 | [P3-1] | [P3-2] |
|---|---|---|
| (11) retest assignment test item | [A] | [B] |
| (12) total usage amount of retest(μl) | 60 | 60 |
| (13) residual liquid amount(μl) | 60 | 30 |

[Retest Dispensing of Test Item [C]]

Next, in the state shown in Table 8, when the request of the retest for a next test item [C] is input, the extraction process of the dilution container of the maximum residual liquid amount is performed according to step S301. Here, the dilution container [P3-1] having the maximum residual liquid amount is extracted by the search among the dilution containers [P3-1] and [P3-2] in which the same diluted sample is stored, based on the history information for each container shown in Table 8 stored in the storage unit 53.

Next, according to step S302, as a dilution container for retest to collect the diluted sample when performing the retest of the test item [C], the dilution container [P3-1] of the maximum residual liquid amount extracted in step S301 is set.

Thereafter, according to step S303, it is determined whether the residual liquid amount of the extracted dilution container [P3-1] is equal to or more than the retest usage amount of the test item [C]. Here, as shown in the residual liquid amount (13) of Table 8, the residual liquid amount of the dilution container [P3-1] in calculation is 60 (μl). In addition, as shown in the retest usage amount (2) of Table 1, since the retest usage amount (2) of the test item [C] is 60 (μl), it is determined that the residual liquid amount of 60 (μl) is equal to or more than the retest usage amount (2) of 60 (μl) of the test item [C] (YES), and the procedure proceeds to step S304.

Next, according to step S304, a dispensing process for retest of the test item [C] is performed for the dilution container [P3-1] set as the dilution container for retest, and thereafter, according to step S305, the history information for each container stored in the storage unit 53 is updated.

Table 9 below shows the history information for each container updated in step S305. As shown in Table 9, in a step in which the test item [C] requested to be retested as the retest assignment test item (11) is additionally assigned to the dilution container [P3-1] and the retest dispensing of the test item [C] ends, the total usage amount of retest (12) is 120 (μl) for the dilution container [P3-1] and 60 (μl) for the dilution container [P3-2]. In addition, the residual liquid amount after retest (13) in calculation is 0 (μl) for the dilution container [P3-1] and 30 (μl) for the dilution container [P3-2].

TABLE 9

| dilution container P3 | [P3-1] | [P3-2] |
|---|---|---|
| (11) retest assignment test item | [A], [C] | [B] |
| (12) total usage amount of retest(μl) | 120 | 60 |
| (13) residual liquid amount(μl) | 0 | 30 |

As described above, all the dispensing processes for the retest on the test items [A], [B], and [C] to which the request for retest is input among the test items [A] to [D] are completed.

Effect of Third Example

According to the third example of the embodiment described above, the dilution container having the maximum residual liquid amount of the diluted sample is set as the dilution container for retest for collecting the diluted sample for retest by the search process of the information stored in the storage unit 53. For this reason, as in the first example, it becomes possible to use for retest without wasting the diluted sample in the plurality of dilution containers in which the same diluted sample is stored, and as in the second example, an effect of achieving the speeding up of the retest dispensing process can be obtained.

The invention claimed is:

1. An automatic analyzer comprising:
a measurement unit comprising:
    a diluted sample holding unit configured to hold a plurality of dilution containers into which a first diluted sample obtained by diluting a first sample to be tested is dispensed;
    a reaction container holding unit configured to hold a plurality of reaction containers;
    a dispensing device configured to dispense the first diluted sample from the dilution containers to the reaction containers; and
    a measuring unit configured to perform optical measurement of the first diluted sample reacted with reagents corresponding to test items in the reaction containers;
a storage unit configured to store information on the first diluted sample associated with each of the dilution containers, wherein the storage unit stores, as the information on the first diluted sample, a dispensing amount of the first diluted sample dispensed into each of the dilution containers, a usage amount of the first diluted sample collected from the dilution containers by the dispensing device, and test items assigned in an initial test; and
a dispensing control unit configured to control a dispensing by the dispensing device,
    wherein the dispensing control unit is configured to cause the measurement unit to extract a dilution container for collecting the first diluted sample for retest among the plurality of dilution containers storing a same diluted sample as the first diluted sample in a dilution container for retest by searching for the information on the first diluted sample stored in the storage unit when retesting a test item for which the necessity of retest has occurred according to a measurement result in an initial test, among a plurality of test items for the same diluted sample, wherein the same diluted sample is a sample obtained by diluting a same sample as the first sample to be tested, with the same dilution solution, wherein the dispensing control unit calculates a residual liquid amount of the first diluted sample remaining in each of the dilution containers based on the information stored in the storage unit, wherein the dispensing control unit causes the dispensing device to perform a retest dispensing process of collecting the first diluted sample for retest from the extracted dilution container when it is determined that the calculated residual liquid amount of the first diluted sample remaining in the extracted dilution container is equal to or more than the usage amount of the first diluted sample collected in the retest, wherein the dispensing control unit re-extracts, based on the calculated residual liquid amount, another dilution container among the plurality of dilution containers storing the same diluted sample as the dilution container for retest, by searching for the information on the first diluted sample stored in the storage unit, when it is determined that the calculated residual liquid amount is smaller than the usage amount of the first diluted sample collected in the retest, and wherein the dispensing control unit is configured to cause the measurement unit to extract the dilution container from which the first diluted sample is collected to perform the initial test for the test item for which the necessity of retest has occurred, among the plurality of dilution containers storing the same diluted sample, as the dilution container for retest, by searching for information on the test items assigned in the initial test for the first diluted sample, stored in the storage unit.

2. The automatic analyzer according to claim 1, further comprising
a liquid amount detector configured to acquire a liquid amount in each of the dilution containers, wherein
the dispensing control unit causes the liquid amount detector to acquire the liquid amount in the extracted dilution container, and causes the dispensing device to perform the retest dispensing process of collecting the first diluted sample for retest from the extracted dilution container when it is determined that the acquired liquid amount is equal to or more than a usage amount of the first diluted sample collected in the retest.

3. The automatic analyzer according to claim 1, further comprising
a liquid amount detector configured to acquire a liquid amount in each of the dilution containers, wherein
the dispensing control unit causes the liquid amount detector to acquire the liquid amount in the extracted dilution container, and extracts another dilution container among the plurality of dilution containers storing the same diluted sample as the dilution container for retest when it is determined that the acquired liquid amount is smaller than a usage amount of the first diluted sample collected in the retest.

4. The automatic analyzer according to claim 1, further comprising
an output unit configured to output a notification that the dispensing for retest is not performed when the dispensing control unit does not extract the dilution container.

5. The automatic analyzer according to claim 1, wherein the dispensing control unit calculates a residual liquid amount of the first diluted sample remaining in each of the dilution containers based on the information stored in the storage unit, and extracts a dilution container having the maximum residual liquid amount among the plurality of dilution containers storing the same diluted sample as the dilution container for retest.

6. The automatic analyzer according to claim 5, further comprising
an output unit configured to output a notification that the dispensing for retest is not performed when the dispensing control unit determines that the residual liquid amount of the first diluted sample in the extracted dilution container is smaller than the usage amount of the first diluted sample collected in the retest.

7. An automatic analysis method by an automatic analyzer including:
a measurement unit comprising:
a diluted sample holding unit configured to hold a plurality of dilution containers into which a first diluted sample obtained by diluting a first sample to be tested is dispensed;
a reaction container holding unit configured to hold a plurality of reaction containers;
a dispensing device configured to dispense the first diluted sample from the dilution containers to the reaction containers; and
a measuring unit configured to perform optical measurement of the first diluted sample reacted with reagents corresponding to test items in the reaction containers;

a storage unit configured to store information on the first diluted sample associated with each of the dilution containers, wherein the storage unit stores, as the information on the first diluted sample, a dispensing amount of the first diluted sample dispensed into each of the dilution containers, a usage amount of the first diluted sample collected from the dilution containers by the dispensing device, and test items assigned in an initial test; and a dispensing control unit configured to control a dispensing by the dispensing device, wherein the dispensing control unit is configured to cause the measurement unit to extract the dilution container from which the first diluted sample is collected to perform the initial test for the test item for which the necessity of retest has occurred, among the plurality of dilution containers storing the same diluted sample, as the dilution container for retest, by searching for information on the test items assigned in the initial test for the first diluted sample, stored in the storage unit, and wherein the dispensing control unit calculates a residual liquid amount of the first diluted sample remaining in each of the dilution containers based on the information stored in the storage unit, and the dispensing device performs a retest dispensing process of collecting the first diluted sample for retest from the extracted dilution container by a control of the dispensing control unit when it is determined that the calculated residual liquid amount of the first diluted sample remaining in the extracted dilution container is equal to or more than the usage amount of the first diluted sample collected in the retest, and wherein the dispensing control unit re-extracts, based on the calculated residual liquid amount, another dilution container among the plurality of dilution containers storing the same diluted sample as the dilution container for retest, by searching for the information on the first diluted sample stored in the storage unit, when it is determined that the calculated residual liquid amount is smaller than the usage amount of the first diluted sample collected in the retest.

* * * * *